United States Patent [19]

Cherpeck

[11] Patent Number: 5,954,843
[45] Date of Patent: Sep. 21, 1999

[54] AMINOCARBAMATES OF POLYALKYL OR POLYALKENYL N-HYDROXYALKYL SUCCINIMIDES AND FUEL COMPOSITIONS CONTAINING THE SAME

[75] Inventor: Richard E. Cherpeck, Cotati, Calif.

[73] Assignee: Chevron Chemical Company LLC, San Francisco, Calif.

[21] Appl. No.: 09/141,634

[22] Filed: Aug. 28, 1998

[51] Int. Cl.[6] .................................. C10L 1/22; C10L 1/18
[52] U.S. Cl. .............................. 44/347; 44/348; 44/387; 548/547
[58] Field of Search .......................... 44/347, 348, 387; 508/290, 291, 464; 548/547, 545

[56] References Cited

U.S. PATENT DOCUMENTS

| | | |
|---|---|---|
| 3,394,144 | 7/1968 | Giles et al. ............................... 260/326 |
| 3,879,306 | 4/1975 | Kablaoui et al. . |
| 4,325,827 | 4/1982 | Papay et al. . |
| 4,420,407 | 12/1983 | Sung et al. . |
| 4,747,850 | 5/1988 | Wollenberg et al. . |
| 4,778,481 | 10/1988 | Courtney . |
| 4,904,278 | 2/1990 | Wollenberg et al. . |
| 5,393,309 | 2/1995 | Cherpeck .................................. 44/347 |
| 5,620,486 | 4/1997 | Cherpeck .................................. 44/347 |

FOREIGN PATENT DOCUMENTS 0 241 417   4/1967   U.S.S.R. .

*Primary Examiner*—Margaret Medley
*Attorney, Agent, or Firm*—Claude J. Caroli

[57] ABSTRACT

Aminocarbamates of polyalkyl or polyalkenyl N-hydroxyalkyl succinimides having the formula:

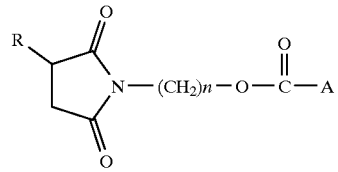

or a fuel soluble salt thereof; wherein

R is a polyalkyl or polyalkenyl group having an average molecular weight in the range of about 450 to about 5,000;

n is an integer from 2 to 5; and

A is a polyamine moiety having at least one basic nitrogen atom, wherein the polyamine is connected to he carbonyl group through one of its nitrogen atoms to form a carbamate linkage.

The compounds of formula I are useful as fuel additives for the prevention and control of engine deposits.

48 Claims, No Drawings

AMINOCARBAMATES OF POLYALKYL OR POLYALKENYL N-HYDROXYALKYL SUCCINIMIDES AND FUEL COMPOSITIONS CONTAINING THE SAME

BACKGROUND OF THE INVENTION

1. Field of the Invention

This invention relates to aminocarbamates of polyalkyl or polyalkenyl N-hydroxyalkyl succinimides and derivatives thereof. In a further aspect, this invention relates to the use of these compounds in fuel compositions to prevent and control engine deposits.

2. Description of the Related Art

It is well known that automobile engines tend to form deposits on the surface of engine components, such as carburetor ports, throttle bodies, fuel injectors, intake ports and intake valves, due to the oxidation and polymerization of hydrocarbon fuel. These deposits, even when present in relatively minor amounts, often cause noticeable driveability problems, such as stalling and poor acceleration. Moreover, engine deposits can significantly increase an automobile's fuel consumption and production of exhaust pollutants. Therefore, the development of effective fuel detergents or "deposit control" additives to prevent or control such deposits is of considerable importance and numerous such materials are known in the art.

For example, aliphatic hydrocarbon-substituted succinimides are known to reduce engine deposits when used in fuel compositions. U.S. Pat. No. 5,393,309, issued Feb. 28, 1995 to R. E. Cherpeck, discloses a fuel additive composition comprising (a) a polyisobutenyl succinimide derived from ethylenediamine or diethylenetriamine, wherein the polyisobutenyl group has an average molecular weight of about 1200 to 1500 and (b) a nonvolatile paraffinic or naphthenic carrier oil, or a mixture thereof.

Similarly, U.S. Pat. No. 5,620,486, issued Apr. 15, 1997 to R. E. Cherpeck, discloses fuel compositions containing hydrocarbyl-substituted N-aryl succinimides wherein the nitrogen atom on the succinimide is substituted with a phenyl ring having one or two substituents selected from hydroxy, carboxyl, nitro, amino and alkylamino.

N-Hydroxyalkyl succinimides are also known in the art. For example, U.S. Pat. No. 3,394,144, issued Jul. 23, 1968 to Giles et al., discloses N-2-hydroxyethyl succinimide and N-3-hydroxypropyl succinimide, which are useful as intermediates in the preparation of substituted anthraquinone dyes for hydrophobic textile materials.

In addition, U.S.S.R. Patent No. 241,417, published Apr. 18, 1969, discloses beta-succinimidoethyl esters of aryloxyalkanecarboxylic acids, which are prepared by reacting beta-succinimidoethanol with aryloxyalkylcarboxylic acids.

SUMMARY OF THE INVENTION

I have now discovered certain aminocarbamates of polyalkyl or polyalkenyl N-hydroxyalkyl succinimides which provide excellent control of engine deposits, especially intake valve deposits, when employed as fuel additives in fuel compositions.

The compounds of the present invention include those having the following formula and fuel soluble salts thereof:

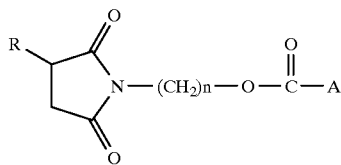

wherein R is a polyalkyl or polyalkenyl group having an average molecular weight in the range of about 450 to about 5,000;

n is an integer from 2 to 5; and

A is a polyamine moiety having at least one basic nitrogen atom, wherein the polyamine is connected to the carbonyl group through one of its nitrogen atoms to form a carbamate linkage.

The present invention further provides a fuel composition comprising a major amount of hydrocarbons boiling in the gasoline or diesel range and a deposit-controlling effective amount of a compound of the present invention.

The present invention additionally provides a fuel concentrate comprising an inert stable oleophilic organic solvent boiling in the range of from about 150° F. to 400° F. and from about 10 to 70 weight percent of a compound of the present invention.

Among other factors, the present invention is based on the surprising discovery that certain aminocarbamates of polyalkyl or polyalkenyl N-hydroxyalkyl succinimides provide excellent control of engine deposits, especially on intake valves, when employed as additives in fuel compositions.

DETAILED DESCRIPTION OF THE INVENTION

In the compounds of the present invention, R is preferably a polyalkyl or polyalkenyl group having an average molecular weight in the range of about 500 to 3,000, more preferably about 700 to 3,000, and most preferably about 900 to 2,500.

Preferably, n is an Integer of from 2 to 3.

A is preferably a polyamine moiety containing about 2 to about 12 amine nitrogen atoms and from about 2 to about 40 carbon atoms. More preferably, A is a polyamine moiety derived from a polyalkylene polyamine containing about 2 to about 12 nitrogen atoms and about 2 to about 24 carbon atoms. Still more preferably, A is a polyamine moiety derived from a polyalkylene polyamine having the formula:

wherein $R_3$ is an alkylene group having about 2 to about 6 carbon atoms and z is an integer from about 1 to about 4. Most preferably A is a polyamine moiety derived from ethylene diamine or diethylene triamine.

The compounds of the present invention will generally have a sufficient molecular weight so as to be non-volatile at normal engine intake valve operating temperatures (about 200°–250° C.). Typically, the molecular weight of the compounds of this invention will range from about 700 to about 3,500, preferably from about 700 to about 2,500.

Fuel-soluble salts of the compounds of formula I can be readily prepared for those compounds containing an amino or substituted amino group and such salts are contemplated to be useful for preventing or controlling engine deposits. Suitable salts include, for example, those obtained by protonating the amino moiety with a strong organic acid, such as an alkyl- or arylsulfonic acid. Preferred salts are derived from toluenesulfonic acid and methanesulfonic acid.

Definitions

As used herein, the following terms have the following meanings unless expressly stated to the contrary.

The term "amino" refers to the group: —NH$_2$.

The term "N-alkylamino" refers to the group: —NHR$_a$ wherein R$_a$ is an alkyl group. The term "N,N-dialkylamino" refers to the group: —NR$_b$R$_c$, wherein R$_b$ and R$_c$ are alkyl groups.

The term "alkyl" refers to both straight- and branched-chain alkyl groups.

The term "lower alkyl" refers to alkyl groups having 1 to about 6 carbon atoms and includes primary, secondary and tertiary alkyl groups. Typical lower alkyl groups include, for example, methyl, ethyl, n-propyl, isopropyl, n-butyl, sec-butyl, t-butyl, n-pentyl, n-hexyl and the like.

The term "polyalkyl" or "polyalkenyl" refers to an alkyl or alkenyl group, respectively, which is generally derived from polyolefins which are polymers or copolymers of mono-olefins, particularly 1-mono-olefins, such as ethylene, propylene, butylene, and the like. Preferably, the mono-olefin employed will have 2 to about 24 carbon atoms, and more preferably, about 3 to 12 carbon atoms. More preferred mono-olefins include propylene, butylene, particularly isobutylene, 1-octene and 1-decene. Polyolefins prepared from such mono-olefins include polypropylene, polybutene, especially polyisobutene, and the polyalphaolefins produced from 1-octene and 1-decene.

The term "fuel" or "hydrocarbon fuel" refers to normally liquid hydrocarbons having boiling points in the range of gasoline and diesel fuels.

General Synthetic Procedures

The aminocarbamates of this invention may be prepared by the following general methods and procedures. It should be appreciated that where typical or preferred process conditions (e.g., reaction temperatures, times, mole ratios of reactants, solvents, pressures, etc.) are given, other process conditions may also be used unless otherwise stated. Optimum reaction conditions may vary with the particular reactants or solvents used, but such conditions can be determined by one skilled in the art by routine optimization procedures.

The compounds of the present invention contain (a) a polyalkyl or polyalkenyl N-hydroxyalkyl succinimide component, (b) an amine component, and (c) a carbamate connecting group which covalently links the polyalkyl or polyalkenyl N-hydroxyalkyl succinimide component and the amine component.

A. The Polyalkyl or Polyalkenyl N-hydroxyalkyl Succinimide

The compounds of the present invention may be prepared by a process which initially involves reaction of a polyalkyl or polyalkenyl succinic anhydride of the formula:

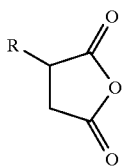

(II)

wherein R is as defined herein, with an alkanolamine of the formula:

H$_2$N—(CH$_2$)$_n$—OH    (III)

wherein n is defined herein, to provide a polyalkyl or polyalkenyl N-hydroxyalkyl succinimide of the formula:

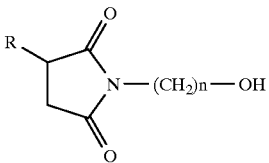

(IV)

wherein R and n are as defined herein.

The polyalkyl or polyalkenyl succinic anhydrides of Formula II are typically prepared by the reaction of maleic anhydride with the desired polyolefin or chlorinated polyolefin, under reaction conditions well known in the art. For example, such succinic anhydrides may be prepared by the thermal reaction of a polyolefin and maleic anhydride, as described, for example in U.S. Pat. Nos. 3,361,673 and 3,676,089. Alternatively, the substituted succinic anhydrides can be prepared by the reaction of chlorinated polyolefins with maleic anhydride, as described, for example, in U.S. Pat. No. 3,172,892. A further discussion of hydrocarbyl-substituted succinic anhydrides can be found, for example, in U.S. Pat. Nos. 5,620,486 and 5,393,309.

Polyalkenyl succinic anhydrides may be converted to polyalkyl succinic anhydrides by using conventional reducing conditions such as catalytic hydrogenation. For catalytic hydrogenation, a preferred catalyst is palladium on carbon. Likewise, polyalkenyl succinimides may be converted to polyalkyl succinimides using similar reducing conditions.

The polyalkyl or polyalkenyl substituent on the succinic anhydrides employed in the invention is generally derived from polyolefins which are polymers or copolymers of mono-olefins, particularly 1-mono-olefins, such as ethylene, propylene, butylene, and the like. Preferably, the mono-olefin employed will have 2 to about 24 carbon atoms, and more preferably, about 3 to 12 carbon atoms. More preferred mono-olefins include propylene, butylene, particularly isobutylene, 1-octene and 1-decene. Polyolefins prepared from such mono-olefins include polypropylene, polybutene, especially polyisobutene, and the polyalphaolefins produced from 1-octene and 1-decene.

A particularly preferred polyalkyl or polyalkenyl substituent is one derived from polyisobutene.

The preferred polyisobutenes used to prepare the presently employed polyalkyl or polyalkenyl succinic anhydrides are polyisobutenes which comprise at least about 20% of the more reactive methylvinylidene isomer, preferably at least 50% and more preferably at least 70%. Suitable polyisobutenes include those prepared using BF$_3$ catalysts. The preparation of such polyisobutenes in which the methylvinylidene isomer comprises a high percentage of the total composition is described in U.S. Pat. Nos. 4,152,499 and 4,605,808. Examples of suitable polyisobutenes having a high alkylvinylidene content include Ultravis 30, a polyisobutene having a number average molecular weight of about 1300 and a methylvinylidene content of about 74%, and Ultravis 10, a polyisobutene having a number average molecular weight of about 950 and a methylvinylidene content of about 76%, both available from British Petroleum.

The alkanolamines of Formula III are known compounds which are available commercially or can be readily prepared using conventional procedures. Suitable alkanolamines include 2-aminoethanol, 3-amino-1-propanol, 4-amino-1-butanol, and 5-amino-1-pentanol. Preferred alkanolamines are 2-aminoethanol and 3-amino-1-propanol.

The polyalkyl or polyalkenyl succinic anhydride and alkanolamine are generally reacted in essentially equivalent amounts at a temperature in the range of about 100° C. to 200° C., and preferably from about 125° C. to about 175° C. The reaction may take place in the presence or absence of an inert solvent.

The time of reaction will vary depending on the particular succinic anhydride and alkanolamine reactants, and the reaction temperature. Generally, the reaction time will range from about one hour to about 24 hours. At the completion of the reaction, the polyalkyl or polyalkenyl N-hydroxyalkyl succinimide product is isolated using conventional techniques.

The reaction of succinic anhydrides with alkanolamines is known in the art and is described, for example, in U.S. Pat. No. 3,394,144.

The polyalkyl or polyalkenyl N-hydroxyalkyl succinimide of formula IV may then be coupled with an appropriate amine component, using phosgene or a phosgene equivalent, to form the desired aminocarbamate of formula I as described in further detail below. Suitable amine reactants which may be employed to form the amine component, i.e., substituent A, of the compounds of the present invention are also discussed more fully below.

B. The Amine Component

As indicated above, the compounds of the present invention contain an amine component which is covalently linked to the aforementioned N-hydroxyalkyl succinimide component through a carbamate connecting group.

In general, the amine component will contain an average of at least about one basic nitrogen atom per molecule. A "basic nitrogen atom" is one that is titratable by a strong acid, for example, a primary, secondary, or tertiary amine nitrogen; as distinguished from, for example, an carbamyl nitrogen, e.g., —OC(O)NH—, which is not titratable with a strong acid. Preferably, at least one of the basic nitrogen atoms of the amine component will be primary or secondary amine nitrogen, more preferably at least one will be a primary amine nitrogen.

The amine component of the aminocarbamates of this invention is preferably derived from a polyamine containing about 2 to about 12 amine nitrogen atoms and from about 2 to about 40 carbon atoms. Polyamines having a carbon-to-nitrogen ratio of from about 1:1 to about 10:1 are particularly preferred.

Suitable polyamines can have a straight- or branched-chain structure and may be cyclic, acyclic, or combinations thereof. Generally, the amine nitrogen atoms of such polyamines will be separated from one another by at least two carbon atoms, i.e., polyamines having an aminal structure are not suitable. The polyamine may also contain one or more oxygen atoms, typically present as an ether or a hydroxyl group. Polyamines having a carbon-to-nitrogen ratio of from about 1:1 to about 10:1 are particularly preferred.

In preparing the compounds of this invention using a polyamine where the various nitrogen atoms of the polyamine are not geometrically equivalent, several substitutional isomers are possible and each of these possible isomers is encompassed within this invention.

A particularly preferred group of polyamines for use in the present invention are polyalkylene polyamines, including alkylene diamines. Such polyalkylene polyamines will typically contain about 2 to about 12 nitrogen atoms and about 2 to about 24 carbon atoms. Preferably, the alkylene groups of such polyalkylene polyamines will contain from about 2 to about 6 carbon atoms, more preferably from about 2 to about 4 carbon atoms.

Examples of suitable polyalkylene polyamines include ethylenediamine, propylenediamine, isopropylenediamine, butylenediamine, pentylenediamine, hexylenediamine, diethylenetriamine, dipropylenetriamine, dimethylaminopropylamine, diisopropylenetriamine, dibutylenetriamine, di-sec-butylenetriamine, triethylenetetraamine, tripropylenetetraamine, triisobutylenetetraamine, tetraethylenepentamine, pentaethylenehexamine, dimethylaminopropylamine, and mixtures thereof.

Particularly suitable polyalkylene polyamines are those having the formula:

wherein $R_3$ is a straight- or branched-chain alkylene group having about 2 to about 6 carbon atoms, preferably about 2 to about 4 carbon atoms, most preferably about 2 carbon atoms, i.e., ethylene (—$CH_2CH_2$—); and z is an integer from about 1 to about 4, preferably about 1 or about 2.

Particularly preferred polyalkylene polyamines are ethylenediamine, diethylenetriamine, triethylenetetraamine, and tetraethylenepentamine. Most preferred are ethylenediamine and diethylenetriamine, especially ethylenediamine.

Also contemplated for use in the present invention are cyclic polyamines having one or more 5- to 6-membered rings. Such cyclic polyamine compounds include piperazine, 2-methylpiperazine, N-(2-aminoethyl) piperazine, N-(2-hydroxyethyl)piperazine, 1,2-bis-(N-piperazinyl)ethane, 3-aminopyrrolidine, N-(2-aminoethyl) pyrrolidine, and the like. Among the cyclic polyamines, the piperazines are preferred.

Many of the polyamines suitable for use in the present invention are commercially available and others may be prepared by methods which are well known in the art. For example, methods for preparing amines and their reactions are detailed in Sidgewick's "*The Organic Chemistry of Nitrogen*", Clarendon Press, Oxford, 1966; Noller's "*Chemistry of Organic Compounds*", Saunders, Philadelphia, 2nd Ed., 1957; and Kirk-Othmer's "*Encyclopedia of Chemical Technology*", 2nd Ed., especially Volume 2, pp. 99–116.

C. The Carbamate Connecting Group

The carbamate connecting group which covalently links the N-hydroxyalkyl succinimide component to the amine component has the formula:

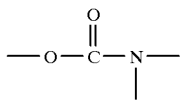

wherein the ether oxygen may be regarded as being derived from the hydroxyl group of a N-hydroxyalkyl succinimide of formula IV and the nitrogen atom may be regarded as being derived from a nitrogen atom of a suitable amine component. The carbonyl group, —C(O)—, is preferably provided by a carbonyl-containing coupling agent, such as phosgene or a phosgene equivalent. Suitable phosgene equivalents include, for example, 1,1'-carbonyldiimidazole, trichloromethyl chloroformate (diphosgene), and bis (trichloromethyl) carbonate (triphosgene).

The aminocarbamates of the present invention are conveniently prepared, for example, by contacting a polyalkyl or polyalkenyl N-hydroxyalkyl succinimide of formula IV with 1,1'-carbonyldiimidazole to produce a N-hydroxyalkyl succinimide acylimidazole. The acylimidazole is then contacted with a suitable polyamine to afford an aminocarbamate of the polyalkyl or polyalkenyl N-hydroxyalkyl succinimide.

The reaction of the N-hydroxyalkylsuccinimide of formula IV with 1,1'-carbonyldiimidazole is typically conducted on an essentially equimolar basis, although excess 1,1'-carbonyldiimidazole can be used to increase the yield of the acylimidazole. The reaction may be conducted by contacting the N-hydroxyalkyl succinimide with 1,1'-carbonyldiimidazole at temperatures ranging from about −10° C. to about 200° C., typically in an inert solvent, such as benzene, toluene, dichloromethane, and the like, for about 0.25 to about 50 hours.

An aminocarbamate is then formed by contacting the N-hydroxyalkyl succinimide acylimidazole with a suitable polyamine at a temperature ranging from about 0° C. to about 150° C. for about 0.01 to about 24 hours. This reaction may be conducted with or without an inert solvent. Suitable inert solvents include benzene, toluene, dichloromethane, and the like. The molar ratio of polyamine to acylimidazole will generally range from about 1:1 to about 20:1, preferably about 5:1 to about 10:1. An excess of polyamine is typically preferred in order to minize bis acylation of the polyamine. The desired product may be obtained by washing the reaction mixture with water and stripping the mixture, usually under vacuum, to remove any residual solvent.

Fuel Compositions

The compounds of the present invention are useful as additives in hydrocarbon fuels to prevent and control engine deposits, particularly intake valve deposits. The proper concentration of additive necessary to achieve the desired deposit control varies depending upon the type of fuel employed, the type of engine, and the presence of other fuel additives.

In general, the concentration of the compounds of this invention in hydrocarbon fuel will range from about 50 to about 2500 parts per million (ppm) by weight, preferably from 75 to 1,000 ppm. When other deposit control additives are present, a lesser amount of the present additive may be used.

The compounds of the present invention may be formulated as a concentrate using an inert stable oleophilic (i.e., dissolves in gasoline) organic solvent boiling in the range of about 150° F. to 400° F. (about 65° C. to 205° C.). Preferably, an aliphatic or an aromatic hydrocarbon solvent is used, such as benzene, toluene, xylene or higher-boiling aromatics or aromatic thinners. Aliphatic alcohols containing about 3 to 8 carbon atoms, such as isopropanol, isobutylcarbinol, n-butanol and the like, in combination with hydrocarbon solvents are also suitable for use with the present additives. In the concentrate, the amount of the additive will generally range from about 10 to about 70 weight percent, preferably 10 to 50 weight percent, more preferably from 20 to 40 weight percent.

In gasoline fuels, other fuel additives may be employed with the additives of the present invention, including, for example, oxygenates, such as t-butyl methyl ether, antiknock agents, such as methylcyclopentadienyl manganese tricarbonyl, and other dispersants/detergents, such as hydrocarbyl amines, hydrocarbyl poly(oxyalkylene) amines, hydrocarbyl poly(oxyalkylene) aminocarbamates, or succinimides. Additionally, antioxidants, metal deactivators and demulsifiers may be present.

In diesel fuels, other well-known additives can be employed, such as pour point depressants, flow improvers, cetane improvers, and the like.

A fuel-soluble, nonvolatile carrier fluid or oil may also be used with the aminocarbamates of this invention. The carrier fluid is a chemically inert hydrocarbon-soluble liquid vehicle which substantially increases the nonvolatile residue (NVR), or solvent-free liquid fraction of the fuel additive composition while not overwhelmingly contributing to octane requirement increase. The carrier fluid may be a natural or synthetic oil, such as mineral oil, refined petroleum oils, synthetic polyalkanes and alkenes, including hydrogenated and unhydrogenated polyalphaolefins, and synthetic polyoxyalkylene-derived oils, such as those described, for example, in U.S. Pat. No. 4,191,537 to Lewis, and polyesters, such as those described, for example, in U.S. Pat. No. 3,756,793 to Robinson and U.S. Pat. No. 5,004,478 to Vogel et al., and in European Patent Application Nos. 356,726, published Mar. 7, 1990, and 382,159, published Aug. 16, 1990.

These carrier fluids are believed to act as a carrier for the fuel additives of the present invention and to assist in removing and retarding deposits. The carrier fluid may also exhibit synergistic deposit control properties when used in combination with an aminocarbamate compound of this invention.

The carrier fluids are typically employed in amounts ranging from about 100 to about 5000 ppm by weight of the hydrocarbon fuel, preferably from 400 to 3000 ppm of the fuel. Preferably, the ratio of carrier fluid to deposit control additive will range from about 0.5:1 to about 10:1, more preferably from 1:1 to 4:1, most preferably about 2:1.

When employed in a fuel concentrate, carrier fluids will generally be present in amounts ranging from about 20 to about 60 weight percent, preferably from 30 to 50 weight percent.

PREPARATIONS AND EXAMPLES

A further understanding of the invention can be had in the following nonlimiting Examples. Wherein unless expressly stated to the contrary, all temperatures and temperature ranges refer to the Centigrade system and the term "ambient" or "room temperature" refers to about 20° C.–25° C. The term "percent" or "%" refers to weight percent and the term "mole" or "moles" refers to gram moles. The term "equivalent" refers to a quantity of reagent equal in moles, to the moles of the preceding or succeeding reactant recited in that example in terms of finite moles or finite weight or volume. Where given, proton-magnetic resonance spectrum (p.m.r. or n.m.r.) were determined at 300 mHz, signals are assigned as singlets (s), broad singlets (bs), doublets (d), double doublets (dd), triplets (t), double triplets (dt), quartets (q), and multiplets (m), and cps refers to cycles per second.

Example 1

Preparation of

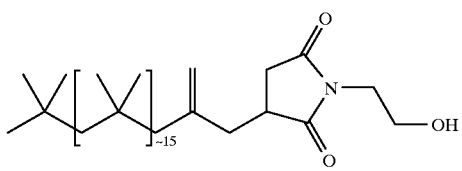

To a flask equipped with a mechanical stirrer, Dean-Stark trap, thermometer, reflux condenser and nitrogen inlet was added 200 grams of polyisobutenylsuccinic anhydride (0.19 moles, saponification number=77.6, derived from polyisobutene which had an approximate molecular weight of 950 and a methylvinylidene content of 86%). Ethanolamine (11.5 milliliters, 0.19 moles) was added dropwise and the mixture was heated to 180° C. for sixteen hours to yield the desired succinimide as a viscous oil after cooling to room temperature.

Example 2

Preparation of

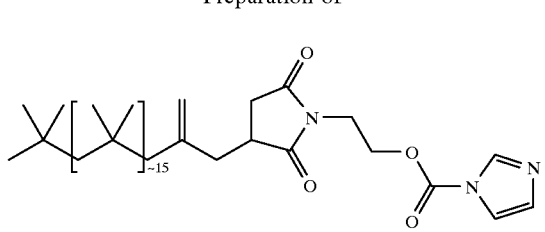

1,1'-Carbonyldiimidazole (14.8 grams) was added to the product from Example 1 (39.9 grams) dissolved in dichloromethane (400 mL). The reaction was stirred under nitrogen at room temperature for two hours and then diluted with dichloromethane (600 mL). Water (300 mL) was added and the mixture was stirred for fifteen minutes at room temperature. The phases were separated, and the organic phase was dried over anhydrous magnesium sulfate, filtered and the solvents removed in vacuo to yield 39.2 grams of the desired product as an amber oil.

Example 3

Preparation of

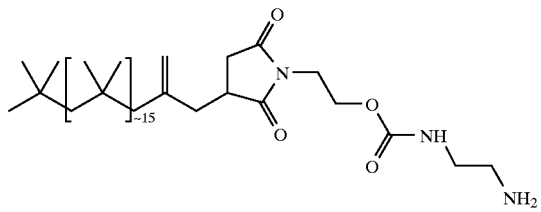

The product from Example 2 (39.2 grams) dissolved in anhydrous dichloromethane (200 mL) was added dropwise to ethylenediamine (22 mL) dissolved in anhydrous dichloromethane (150 mL) under nitrogen at room temperature. The reaction was stirred at room temperature for 16 hours, diluted with dichloromethane (600 mL), washed twice with water (200 mL), dried over anhydrous sodium sulfate, filtered and the solvents removed in vacuo to yield 14.7 grams of the desired carbamate as an oil. $^1$H NMR (CDCl$_3$, D$_2$O) □ 4.8 (d,2H), 4.2 (t, 2H), 3.75 (t, 2H), 3.2 (t, 2H), 0.7–3.1 (m, 138H).

Example 4

Preparation of

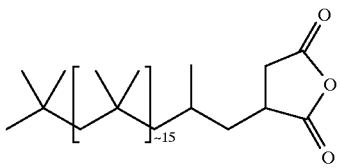

A solution of 200 grams of polyisobutenylsuccinic anhydride (0.19 moles, saponification number=77.6, derived from polyisobutene which had an approximate molecular weight of 950 and a methylvinylidene content of 86%). in 750 mL of ethyl acetate and 500 mL of toluene containing 12.4 grams of 10% palladium on charcoal was hydrogenated at 40 psi for 24 hours on a Parr low-pressure hydrogenator. The catalyst was filtered away and the solvent was removed in vacuo to yield the desired polyisobutylsuccinic anhydride.

Example 5

Preparation of

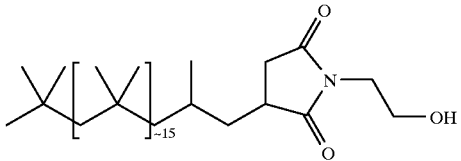

To a flask equipped with a mechanical stirrer, Dean-Stark trap, thermometer, reflux condensor and nitrogen inlet was added 161.3 grams of polyisobutylsuccinic anhydride (0.15 moles) from Example 4. Ethanolamine (10 mL, 0.15 moles) was added dropwise and the mixture was heated to 180° C. for 36 hours to yield the desired succinimide as a viscous oil after cooling to room temperature.

Example 6

Preparation of

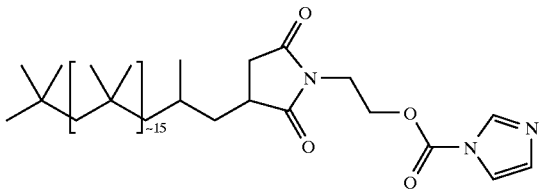

1,1'-Carbonyldiimidazole (4.0 grams) was added to the product from Example 5 (10.4 grams) dissolved in dichloromethane (100 mL). The reaction was stirred under nitrogen at room temperature for 36 hours and then diluted with dichloromethane (200 mL). Water (100 mL) was added and the mixture was stirred for fifteen minutes at room temperature. The phases were separated, and the organic phase was dried over anhydrous sodium sulfate, filtered and the solvents removed in vacuo to yield the desired product as an oil.

Example 7

Preparation of

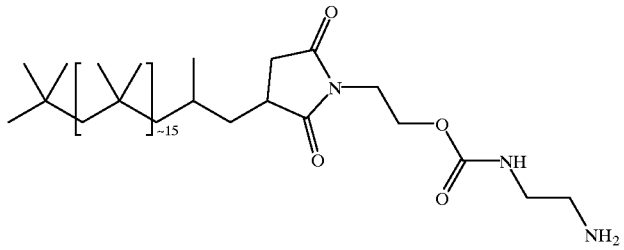

The entire product from Example 6 dissolved in anhydrous dichloromethane (100 mL) was added dropwise to ethylenediamine (5.7 grams) dissolved in anhydrous dichloromethane (80 mL) under nitrogen at room temperature. The reaction was stirred at room temperature for 56 hours, diluted with dichloromethane (200 mL), washed twice with water (100 mL), dried over anhydrous sodium sulfate, filtered and the solvents removed in vacuo to yield 8.25 grams as an oil. The resultant oil was chromatographed on silica gel eluting with hexane/ethyl acetate (1:1), followed by hexane/diethyl ether/methanol/isopropylamine (40:40:15:5) to yield the desired succinimide. $^1$H NMR (CDCl$_3$, D$_2$O) □ 4.2 (t, 2H), 3.75 (t, 2H), 3.2 (t, 2H), 0.7–3.1 (m, 142H).

Example 8

Single-cylinder Engine Test

The test compounds were blended in gasoline and their deposit reducing capacity determined in an ASTM/CFR single-cylinder engine test.

A Waukesha CFR single-cylinder engine was used. Each run was carried out for 15 hours, at the end of which time the intake valve was removed, washed with hexane and weighed. The previously determined weight of the clean valve was subtracted from the weight of the value at the end of the run. The differences between the two weights is the weight of the deposit. A lesser amount of deposit indicates a superior additive. The operating conditions of the test were as follows: water jacket temperature 200° F.; vacuum of 12 in Hg, air-fuel ratio of 12, ignition spark timing of 40° BTC; engine speed is 1800 rpm; the crankcase oil is a commercial 30 W oil.

The amount of carbonaceous deposit in milligrams on the intake valves is reported for each of the test compounds in Table I and Table II.

TABLE I

| Sample[1] | Intake Valve Deposit Weight (in milligrams) | | |
|---|---|---|---|
| | Run 1 | Run 2 | Average |
| Base Fuel | 317.7 | 274.5 | 296.1 |
| Example 3 | 95.0 | — | 95.0 |

TABLE II

| Sample[1] | Intake Valve Deposit Weight (in milligrams) | | |
|---|---|---|---|
| | Run 1 | Run 2 | Average |
| Base Fuel | 361.3 | 341.6 | 351.5 |
| Example 7 | 140.6 | — | 140.6 |

[1]At 50 parts per million actives (ppma) and 50 ppm of α-hydroxy-ω-4-dodecylphenoxypoly(oxypropylene) having an average of 12–13 oxypropylene units (prepared essentially as described in Example 6 of U.S. Pat. No. 4,160,648) carrier oil.

The base fuel employed in the above single-cylinder engine tests was a regular octane unleaded gasoline containing no fuel detergent. The test compounds were admixed with the base fuel to give a concentration of 50 ppma (parts per million actives) and 50 ppm of α-hydroxy-ω-4-dodecylphenoxypoly(oxypropylene) having an average of 12–13 oxypropylene units (prepared essentially as described in Example 6 of U.S. Pat. No. 4,160,648) carrier oil.

The data in Tables I an II illustrates the significant reduction in intake valve deposits provided by the esters of the present invention (Examples 3 and 7) compared to the base fuel.

What is claimed is:

1. A compound of the formula:

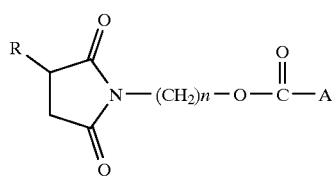

or a fuel soluble salt thereof; wherein

R is a polyalkyl or polyalkenyl group having an average molecular weight in the range of about 450 to about 5,000;

n is an integer from 2 to 5; and

A is a polyamine moiety having at least one basic nitrogen atom, wherein the polyamine is connected to the carbonyl group through one of its nitrogen atoms to form a carbamate linkage.

2. The compound according to claim 1, wherein R is a polyalkyl or polyalkenyl group having an average molecular weight in the range of about 500 to 3,000.

3. The compound according to claim 2, wherein R is a polyalkyl or polyalkenyl group having an average molecular weight in the range of about 700 to 3,000.

4. The compound according to claim 3, wherein R is a polyalkyl or polyalkenyl group having an average molecular weight in the range of about 900 to 2,500.

5. The compound according to claim 1, wherein R is a polyalkyl or polyalkenyl group derived from polypropylene, polybutene, or a polyalphaolefin oligomer of 1-octene or 1-decene.

6. The compound according to claim 5, wherein R is a polyalkyl or polyalkenyl group derived from polyisobutene.

7. The compound according to claim 6, wherein the polyisobutene contains at least about 20% of a methylvinylidene isomer.

8. The compound according to claim 1, wherein n is 2 or 3.

9. The compound according to claim 1, wherein A is a polyamine moiety having from about 2 to about 12 amine nitrogen atoms and from about 2 to about 40 carbon atoms.

10. The compound according to claim 9, wherein A is a polyamine moiety derived from a polyalkylene polyamine containing from about 2 to about 12 amine nitrogen polyamine atoms and from about 2 to about 24 carbon atoms.

11. The compound according to claim 10, wherein the polyalkylene polyamine has the formula:

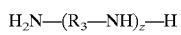

wherein $R_3$ is an alkylene group having from about 2 to about 6 carbon atoms and z is an integer from about 1 to about 4.

12. The compound according to claim 11, wherein $R_3$ is an alkylene group having from about 2 to about 4 carbon atoms.

13. The compound according to claim 12, wherein the polyalkylene polyamine is ethylene diamine or diethylene triamine.

14. The compound according to claim 13, wherein the polyalkylene polyamine is ethylene diamine.

15. The compound according to claim 1, wherein R is a polyalkyl or polyalkenyl group derived from polyisobutene, n is 2 or 3, and A is a polyamine moiety derived from ethylene diamine.

16. A fuel composition comprising a major amount of hydrocarbons boiling in the gasoline or diesel range and an effective deposit-controlling amount of a compound of the formula:

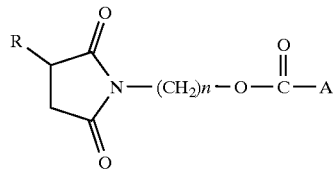

or a fuel soluble salt thereof; wherein

R is a polyalkyl or polyalkenyl group having an average molecular weight in the range of about 450 to about 5,000;

n is an integer from 2 to 5; and

A is a polyamine moiety having at least one basic nitrogen atom, wherein the polyamine is connected to the carbonyl group through one of its nitrogen atoms to form a carbamate linkage.

17. The fuel composition according to claim 16, wherein R is a polyalkyl or polyalkenyl group having an average molecular weight in the range of about 500 to 3,000.

18. The fuel composition according to claim 17, wherein R is a polyalkyl or polyalkenyl group having an average molecular weight in the range of about 700 to 3,000.

19. The fuel composition according to claim 18, wherein R is a polyalkyl or polyalkenyl group having an average molecular weight in the range of about 900 to 2,500.

20. The fuel composition according to claim 16, wherein R is a polyalkyl or polyalkenyl group derived from polypropylene, polybutene, or a polyalphaolefin oligomer of 1-octene or 1-decene.

21. The fuel composition according to claim 20, wherein R is a polyalkyl or polyalkenyl group derived from polyisobutene.

22. The fuel composition according to claim 21, wherein the polyisobutene contains at least about 20% of a methylvinylidene isomer.

23. The fuel composition according to claim 16, wherein n is 2 or 3.

24. The fuel composition according to claim 16, wherein A is a polyamine moiety having from about 2 to about 12 amine nitrogen atoms and from about 2 to about 40 carbon atoms.

25. The fuel composition according to claim 24, wherein A is a polyamine moiety derived from a polyalkylene polyamine containing from about 2 to about 12 amine nitrogen polyamine atoms and from about 2 to about 24 carbon atoms.

26. The fuel composition according to claim 25, wherein the polyalkylene polyamine has the formula:

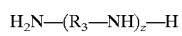

wherein $R_3$ is an alkylene group having from about 2 to about 6 carbon atoms and z is an integer from about 1 to about 4.

27. The fuel composition according to claim 26, wherein $R_3$ is an alkylene group having from about 2 to about 4 carbon atoms.

28. The fuel composition according to claim 27, wherein the polyalkylene polyamine is ethylene diamine or diethylene triamine.

29. The fuel composition according to claim 28, wherein the polyalkylene polyamine is ethylene diamine.

30. The fuel composition according to claim 16, wherein R is a polyalkyl or polyalkenyl group derived from polyisobutene, n is 2 or 3, and A is a polyamine moiety derived from ethylene diamine.

31. The fuel composition according to claim 16, wherein the composition contains from about 50 to about 2,000 parts per million by weight of said compound.

32. The fuel composition according to claim 16, where the composition further contains from about 100 to about 5,000 parts per million by weight of a fuel-soluble, nonvolatile carrier fluid.

33. A fuel concentrate comprising an inert stable oleophilic organic solvent boiling in the range of from about 150° F. to 400° F. and from about 10 to about 70 weight percent of a compound of the formula:

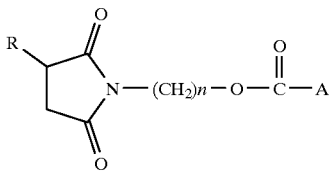

or a fuel soluble salt thereof; wherein

R is a polyalkyl or polyalkenyl group having an average molecular weight in the range of about 450 to about 5,000;

n is an integer from 2 to 5; and

A is a polyamine moiety having at least one basic nitrogen atom, wherein the polyamine is connected to the carbonyl group through one of its nitrogen atoms to form a carbamate linkage.

34. The fuel concentrate according to claim 33, wherein R is a polyalkyl or polyalkenyl group having an average molecular weight in the range of about 500 to 3,000.

35. The fuel concentrate according to claim 34, wherein R is a polyalkyl or polyalkenyl group having an average molecular weight in the range of about 700 to 3,000.

36. The fuel concentrate according to claim 35, wherein R is a polyalkyl or polyalkenyl group having an average molecular weight in the range of about 900 to 2,500.

37. The fuel concentrate according to claim 33, wherein R is a polyalkyl or polyalkenyl group derived from polypropylene, polybutene, or a polyalphaolefin oligomer of 1-octene or 1-decene.

38. The fuel concentrate according to claim 37, wherein R is a polyalkyl or polyalkenyl group derived from polyisobutene.

39. The fuel concentrate according to claim 38, wherein the polyisobutene contains at least about 20% of a methylvinylidene isomer.

40. The fuel concentrate according to claim 33, wherein n is 2 or 3.

41. The fuel concentrate according to claim 33, wherein A is a polyamine moiety having from about 2 to about 12 amine nitrogen atoms and from about 2 to about 40 carbon atoms.

42. The fuel concentrate according to claim 41, wherein A is a polyamine moiety derived from a polyalkylene polyamine containing from about 2 to about 12 amine nitrogen polyamine atoms and from about 2 to about 24 carbon atoms.

43. The fuel concentrate according to claim 42, wherein the polyalkylene polyamine has the formula:

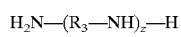

wherein $R_3$ is an alkylene group having from about 2 to about 6 carbon atoms and z is an integer from about 1 to about 4.

44. The fuel concentrate according to claim 43, wherein $R_3$ is an alkylene group having from about 2 to about 4 carbon atoms.

45. The fuel concentrate according to claim 44, wherein the polyalkylene polyamine is ethylene diamine or diethylene triamine.

46. The fuel concentrate according to claim 45, wherein the polyalkylene polyamine is ethylene diamine.

47. The fuel concentrate according to claim 33, wherein R is a polyalkyl or polyalkenyl group derived from polyisobutene, n is 2 or 3, and A is a polyamine moiety derived from ethylene diamine.

48. The fuel concentrate according to claim 33, wherein the fuel concentrate further contains from about 20 to about 60 weight percent of a fuel-soluble, nonvolatile carrier fluid.

* * * * *